A. McMURTRIE.
ATTACHMENT FOR ELECTRICAL CONDUITS.
APPLICATION FILED APR. 25, 1907.

975,777.

Patented Nov. 15, 1910.

Witnesses:

Asuah McMurtrie Inventor

UNITED STATES PATENT OFFICE.

ADNAH McMURTRIE, OF NEW YORK, N. Y., ASSIGNOR TO THOMAS & BETTS COMPANY, OF NEW YORK, N. Y., A CORPORATION OF NEW YORK.

ATTACHMENT FOR ELECTRICAL CONDUITS.

975,777.           Specification of Letters Patent.     Patented Nov. 15, 1910.

Application filed April 25, 1907. Serial No. 370,117.

*To all whom it may concern:*

Be it known that I, ADNAH McMURTRIE, of New York, N. Y., have invented certain Improvements in Attachments for Electrical Conduits, of which the following description, in connection with the accompanying drawings, is a specification, like letters on the drawings designating like parts This invention relates to systems of armor for electrical conductors and more particularly to attachments for securing various forms of tubular armor or "sheaths," as I will term them generically, at the region of their union with outlet boxes or similar electrical conduit members.

My present invention is of the general type of such devices, in which a member is wedged between the armor sheath and the wall of the aperture through which the conductors enter the outlet box; and in accordance with my improvements the wedge is so arranged as to force the sheath into contact with the wall of the aperture, effecting direct physical and electrical union therewith, instead of relying upon the indirect grip of a plurality of fingers which, in the earlier forms of such a device, intervene between the sheath and the wall of the aperture, making a double interruption of the continuity of the path for the electrical current to ground, in emergencies. I avoid also the rotative motion heretofore required in some such devices to fasten the sheath, which motion is not always convenient, and apertures of special contour are not essential to the use of my improvements, which can be applied to existing structures without modification.

The various features of my invention will be illustrated and described fully in the accompanying drawings and specification and pointed out in the claims.

Figure 1:
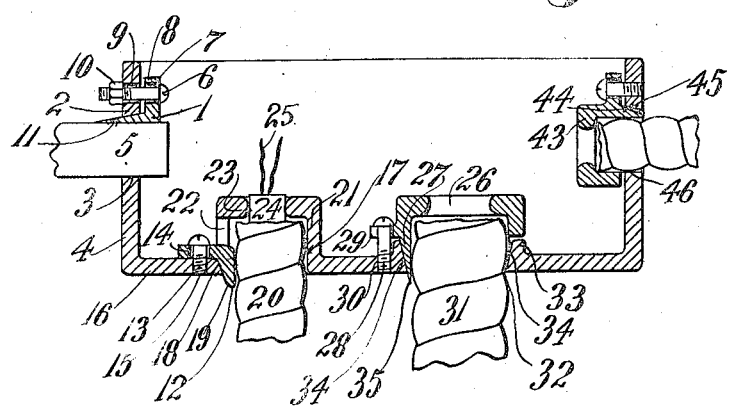
Figure 2:
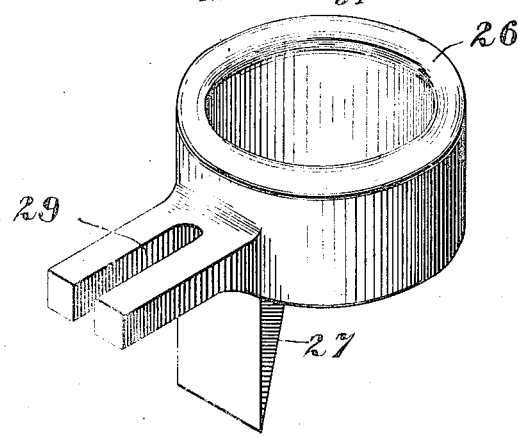

In the drawings, Figure 1 is a view in vertical section of an outlet box furnished with attachments in the construction of which my invention has been embodied. Fig. 2 is a perspective view of one of the bushings with its wedge, showing the general relation therebetween.

In the embodiment of my invention selected for illustration and description as a convenient form of construction to enable ready and complete understanding of my improvements, referring to the drawings, the part designated by the reference numeral 1 is a wedge member introduced between the wall 2 of the aperture 3 in the plate 4 constituting the side wall of an electrical outlet box, and an armor sheath 5 passing through the aperture, suitable means 6 being provided to move the wedge co-axially with respect to the sheath, to force the latter into direct physical and electrical contact with the wall of the aperture.

The actuating means 6 may take any convenient and suitable form, and is shown as a short screw bolt passing through a plain hole 7 in a lug 8 of the wedge member, and through a plain hole 9 in the box wall, a nut 10 serving to retain it in adjusted position. This form of wedge member has its surface 11 inclined and can be used readily in the ordinary round hole 3 usual to the well-known type of cast or pressed metal outlet box illustrated, and with any of the tubular armor sheaths known to the trade, whether having a separate identity as "conduit" into which conductors are fished, or formed as a unitary structure with the conductors, and thus installed, as in the lead covered cable or the "armored conductors", so-called. At 12 a similar wedge member is provided with an actuating screw 13, passing through a plain slot 14 into a threaded hole 15 in the bottom plate or wall 16 of the box near the aperture 17, which may be beveled as shown at 18 to correspond with the coöperating surface 19 of the wedge, the screw 13 when driven home causing co-axial movement of the wedge 12 relatively to the armored conductor sheath 20, and at the same time forcing the sheath into direct physical and electrical contact with the opposite wall of the aperture 17. I have shown this aperture as provided with a housing 21, formed integrally with the bottom of the box, and having a gateway 22 for the wedge, and an annular shoulder 23 to prevent abrasion of the insulation 24 on the conductors 25. A similar housing may be formed integrally, or as a unitary structure, with the wedge member, as the housing 26 carried by the wedge 27 in the central portion of Fig. 1. A screw 28 may serve as the actuating means in this instance, passing through a slotted lug 29 into a threaded hole 30 in the bottom of the box, and operating in the manner already described to draw the wedge and force the sheath 31 into direct physical and electrical contact with the opposite wall of the aperture 32. This aperture may be provided with a neck 33 having a beveled face 34 to coöperate with the surface 35 of the wedge on one side and aid in retaining the sheath 31 on the other, as illustrated. This portion of Fig. 1 illustrates clearly the advantage of this wedge over the multiple fingers used in earlier forms of such devices for securing the direct engagement between the sheath and aperture wall, in accordance with my improvements.

I have shown a neck 33 in the center of the box merely because one is frequently found there to strengthen the wall of the box and afford an extended bearing around the central aperture 32 which is often used to receive the gas pipe, or to receive a support for the box, as when the box is inverted below a ceiling in a manner readily understood by inverting the drawing, when the sheath 31 would be seen in place of a support, and not infrequently existing boxes will be found with holes in the region near this central aperture, already threaded for the attachment of fixture studs or other devices, so that the screw 28 can be seated in one of these without the need for any alteration, the lug slot 29 permitting some adjustment of the screw for this purpose, and when open at the outer end, as shown, the lug may be applied to the screw after the latter has been started into the hole 30.

The attachment illustrated at 43 is substantially the same in construction as that numbered 26 and already described, but its wedge 44 is somewhat shortened to coöperate with the beveled wall 45 of the aperture 46, where it is less convenient to utilize a neck.

Having illustrated and described thus fully various forms of construction in which my invention may be embodied advantageously, it will be understood that I do not limit myself to these specific forms, nor to the specific material mentioned, nor in general otherwise than as set forth in the claims read in connection with this specification.

What I claim as new and desire to secure by Letters Patent is:—

1. The combination with a plate apertured to pass an electrical conductor and an armor sheath therefor, of an attaching member comprising a wedge and means to move said wedge through said plate co-axially with respect to said sheath to force the latter into binding engagement with the opposite wall of said aperture, substantially as described.

2. An attaching member for the purpose set forth, comprising a wedge to enter a sheath-receiving aperture in an outlet box between said sheath and the wall of said aperture, and means to drive said wedge through said wall co-axially with respect to said sheath, to force said sheath into direct physical and electrical contact with the opposite wall of said aperture, substantially as described.

3. An attaching member for the purpose set forth; comprising a wedge to enter a sheath-receiving aperture in the wall of an outlet box between said sheath and the wall of said aperture, means to drive said wedge through said wall co-axially with respect to said sheath, to force said sheath into direct physical and electrical contact with the opposite wall of said aperture, and a sheath-end-housing carried by said wedge.

Signed at New York in the county and State of New York this sixteenth day of April, 1907.

ADNAH McMURTRIE.

Witnesses:
ALEXANDER C. PROUDFIT,
HOBART W. BETTS.